Nov. 12, 1929.  P. A. ROBBINS  1,735,796
GRADER
Filed Dec. 10, 1928
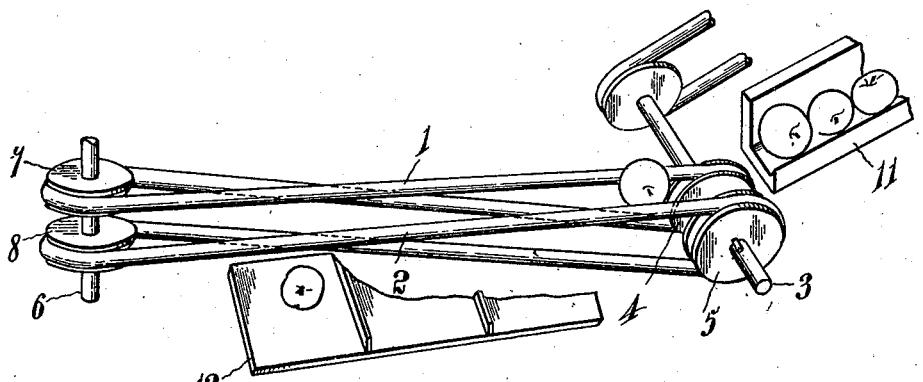
Fig. 1.
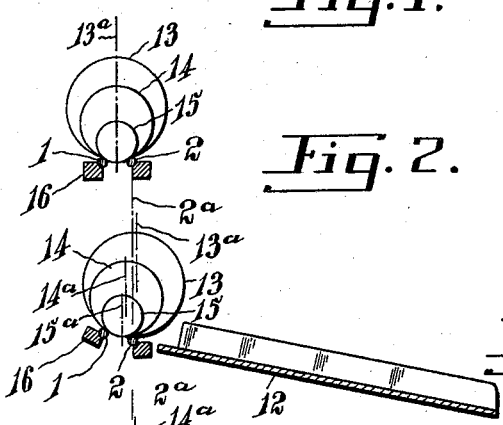
Fig. 2.
Fig. 3.
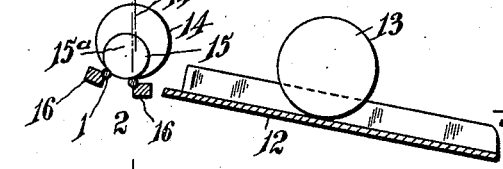
Fig. 4.
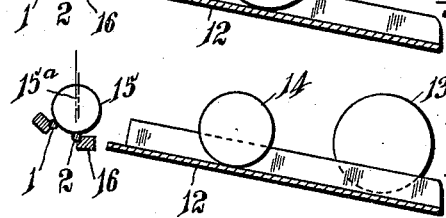
Fig. 5.
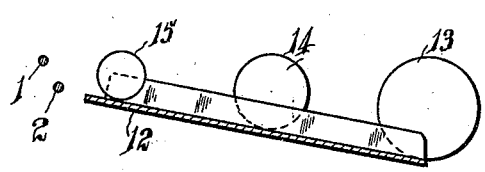
Fig. 6.
Inventor
P. A. Robbins
by J. Edw. Maybee
ATTY.

Patented Nov. 12, 1929

1,735,796

UNITED STATES PATENT OFFICE

PERCY A. ROBBINS, OF HIGHLAND PARK, ILLINOIS

GRADER

Application filed December 10, 1928. Serial No. 325,053.

This invention relates to graders for fruit and the like. Heretofore in the art of grading fruits it has been customary to carry the fruit on travelling bands or belts which lie in a horizontal plane and diverge from one another to permit the fruit to drop between the belts when a point is reached where the belts are suitably spread apart. The fruit is held between the belts by an angle of nip and just before reaching the point where the angle of nip is 180 degrees, at which point the fruit drops between the belts, the weight of the fruit tends to cause the pressure at the points of nip to become great enough to mar fruits having delicate skins. As the drop must be sufficient to permit the fruit to roll from beneath the belts, the fruit is often bruised, and my object is to provide a grader which will overcome the above objectionable features and which is extremely simple in construction.

I attain my object by providing substantially parallel belt conveyors which are gradually turned from a horizontal plane to a vertical plane whereby the fruit being carried thereby will roll off or be discharged laterally therefrom when its center of gravity is shifted past the vertical center line of the lower belt.

The constructions are hereinafter more fully described and are illustrated in the accompanying drawings in which—

Fig. 1 is a perspective view of my grader;

Fig. 2 a cross sectional detail of the receiving end of the belts showing three pieces of fruit carried thereby; and Figs. 3, 4, 5 and 6 cross sectional details illustrating various positions of the belts as they move towards a vertical plane.

In the drawings like numerals of reference indicate corresponding parts in the different figures.

1 and 2 are the endless conveyor belts which are passed round pulleys 4, 7; and 5, 8 respectively. The pulleys 4 and 5 are carried in spaced relationship on a drive shaft 3 having its axis substantially horizontal and being suitably journalled on a frame not shown. The pulleys 7 and 8 are so located on and secured to a substantially vertical shaft 6 that the belts 1 and 2 will be substantially parallel to one another. A chute 11 is provided for feeding fruit to be graded to the horizontal portion of the conveyor belts.

As the fruit is being carried along on the belts the latter causes the center of gravity of the fruit to be shifted gradually towards and past the vertical center line $2^a$ of the belt 2. When the center of gravity has been shifted sufficiently past the vertical center line the fruit merely rolls off the belt 2 onto a discharge chute 12 which will be partitioned off to segregate the fruit discharged at various points along the length of the grader. In Fig. 2 three pieces 13, 14 and 15 of different sized fruit are resting on the horizontally portions or feed ends of the belts 1 and 2. The centers of gravity of these pieces are substantially midway of the vertical center lines of the belts. In Fig. 3 the piece 13 has been shifted so that its center of gravity lying in the vertical line $13^a$ now lies beyond the vertical center line $2^a$ of the belt 2, whereby this piece of fruit will roll off the grader as shown in Fig. 4. The pieces 14 and 15 have their centers of gravity lying in the vertical lines $14^a$ and $15^a$ and these centers of gravity have been shifted in Fig. 3 towards the center line $2^a$. In Fig. 4 the vertical line $14^a$ is past the center line $2^a$ and therefore the piece of fruit 14 is positioned for rolling off the belt 2 on to the discharge chute 12 which is located close to the belt.

It will be noted that with this type of grader the fruit is merely rested on belts and is not discharged between belts and therefore there is no tendency of the belts 1 and 2 to mar fruit having the most delicate skin. As the fruit is not dropped on to the discharge chute the danger of bruising it from this cause is also eliminated.

Any suitable means such as guide bars 16, (Figs. 2 to 5) for supporting the belts 1 and 2 may be used to prevent the belts from being deflected by the weight of the fruit.

What I claim is:

1. A grader including a way having two lines of contact with the article to be graded, the lines of contact being gradually twisted transversely to the length of the way to bring the lines of contact from a substantially horizontal plane towards a vertical plane to cause the article to roll off the way.

2. A fruit grader including a conveyor having fruit engaging sides, the sides being gradually twisted from a substantially side by side position towards a position substantially one above the other to cause the fruit to roll off the conveyor.

3. A grader including conveyor belts twisted transversely to the direction of conveyance from a substantially side by side position towards a position substantially one above the other to shift the center of gravity of the article being graded past the vertical center line of the lower belt.

4. A grader including conveyor belts twisted throughout their length from a substantially side by side position towards a position substantially one above the other to shift the center of gravity of the article being graded past the vertical center line of the lower belt.

5. A grader including two spaced pulleys having their axes substantially horizontal; two spaced pulleys having their axes substantially vertical; and endless conveyor belts passed around the pulleys.

6. A grader including a way having two travelling sides spaced apart and arranged in a warped plane which is approximately horizontal at the feed end of the grader and twists transversely to and throughout the length of the way towards a vertical plane to shift the center of gravity of the article being graded past its point of support on the lower one of the said sides.

Signed at Highland Park, in the State of Illinois, this 15 day of November, 1928.

PERCY A. ROBBINS.